Patented Dec. 7, 1937

2,101,326

UNITED STATES PATENT OFFICE 2,101,326

STORAGE BATTERY SEPARATOR CONTAINING A COMPOUND OF MERCURY

Joseph Lester Woodbridge, Philadelphia, Pa., assignor to The Electric Storage Battery Company, Philadelphia, Pa., a corporation of New Jersey No Drawing. Application January 17, 1934, Serial No. 706,970

2 Claims. (Cl. 136—146)

The use of mercury dissolved in the electrolyte of a cell has already been proposed and has been shown to have some beneficial effect on the negative plates. The introduction of mercury into the grids of the negative plates, and into the active material, is also old. I have found, however, that, by introducing into the cell a quantity of sparingly soluble compound of mercury which maintains a source of supply of a mercury compound in the electrolyte over an extended period of time, the beneficial effect of the mercury is increased to a marked degree.

The theory of the action of a compound of mercury dissolved in the electrolyte in its effect on the negative plate is somewhat obscure. It may, however, be quite similar to the effect of amalgamating with mercury the surface of the zinc electrode in a primary cell, which is recognized as having a beneficial effect in preventing the zinc from combining with the electrolyte while the cell is standing idle. In the case of the storage battery of the lead-acid type, the active material of the negative plate, which in a healthy cell in a fully charged condition is pure, spongy lead, will occasionally in service become more or less sulphated so that the surfaces of the fine particles of spongy lead become partly coated with a layer of more or less impervious lead sulphate, and, when a soluble compound of mercury is introduced into the electrolyte of such a cell, it is entirely plated out on those surfaces of the negative active material which are not thus covered by sulphate and thereafter becomes incapable of producing any further improvement.

If, however, there is present in the cell a supply of a sparingly soluble compound of mercury sufficient to saturate the electrolyte, and yet leave an appreciable surplus undissolved, whenever the mercury in the electrolyte is plated out, as referred to above, a fresh amount will be dissolved from the supply of undissolved mercury compound, maintaining the saturation of the electrolyte so that, as the layer of sulphate on the surface of the negative active material is reduced by the electrolytic action of the charging current, the freshly exposed surface of pure lead will receive a plating of mercury, and the beneficial effect of the mercury will be extended until, finally, the entire surface of the active material will be protected in this way.

In accordance with the present invention, I propose to accomplish the results described above by impregnating the separators, which may be of wood or similar porous material, with a sparingly soluble compound of mercury. One practical and successful method of doing this is to soak the wood separators, after the usual treatment for removing injurious organic compounds, in a solution of mercurous nitrate. Mercurous nitrate is quite soluble in water, and, by the soaking above referred to, the separators will be impregnated with a very appreciable amount of this compound. When separators thus treated are immersed in the ordinary storage battery electrolyte of dilute sulphuric acid, the mercurous nitrate is converted into a less soluble compound of mercury, probably a mercurous sulphate, but possibly there may be some organic compound of mercury as well. Whatever the exact nature of this reaction which takes place, the separator is now impregnated with a sparingly soluble compound of mercury, and, when the cell assembled with these separators is subjected to the usual cycles of charge and discharge or to a continuous very low rate trickle charge, such as occurs in the usual floating operation of a cell, the compound of mercury is gradually dissolved in the electrolyte, from which it is plated onto the active material of the negative plate, and a fresh supply of the partially soluble compound is dissolved in the electrolyte. Thus the effect of the mercury is maintained throughout a very considerable period of time.

The separators, after being impregnated with mercurous nitrate, may be immersed in dilute sulphuric acid before assembly in the cells, or they may be first assembled with the elements in the cells and the electrolyte then added. In the latter case, the small amount of nitric acid released in the cell will not be objectionable, if the positive plates have previously been formed.

There are, of course, other ways in which a supply of partially soluble mercury compound may be maintained in the cell; for example, a receptacle of impervious material, such as hard rubber with perforated walls filled with the partially soluble mercury compound, may be suspended in the electrolyte of the cell above or alongside of the plates, where it will be subjected to the wash of the electrolyte and maintain a supply of the compound of mercury in the electrolyte as this becomes depleted.

Where the compound of mercury is suspended in the cell in a separate container, it must be located in the active electrolyte, that is, above a point slightly below the lower edges of the plate, rather than in the space below the plates, where the electrolyte is not stirred up by the gassing of the cell during charge.

I do not want to confine this disclosure to any particular theory as to the manner in which the mercury affects the negative plate, or to limit the invention to any particular compounds of mercury.

In the case of a separator comprising a porous rubber composition, or the like, the mercury compound may be incorporated in the material during its manufacture, and the term "impregnated" in the claims is intended to cover this combination.

I do not intend to be limited save as the scope of the prior art and of the attached claims may require.

I claim:

1. A separator for a lead-acid storage battery comprising a diaphragm of porous material impregnated with mercurous nitrate.

2. As an article of manufacture a separator for a lead-acid storage battery comprising a diaphragm of porous material impregnated with a water-soluble salt of mercury.

JOSEPH LESTER WOODBRIDGE.